United States Patent
Wind, III

(10) Patent No.: US 10,445,808 B2
(45) Date of Patent: Oct. 15, 2019

(54) APPARATUS TO QUERY A RELATIONAL DATABASE USING TEXT-BASED QUERIES

(71) Applicant: Walmart Apollo, LLC, Bentonville, AR (US)

(72) Inventor: Anthony G. Wind, III, Gravette, AR (US)

(73) Assignee: Walmart Apollo, LLC, Bentonville, AR (US)

(*) Notice: Subject to any disclaimer, the term of this patent is extended or adjusted under 35 U.S.C. 154(b) by 431 days.

(21) Appl. No.: 15/187,885

(22) Filed: Jun. 21, 2016

(65) Prior Publication Data

US 2017/0004176 A1 Jan. 5, 2017

Related U.S. Application Data

(60) Provisional application No. 62/187,518, filed on Jul. 1, 2015.

(51) Int. Cl.
*G06Q 30/00* (2012.01)
*G06Q 30/06* (2012.01)
*G06F 16/245* (2019.01)
*G06F 16/22* (2019.01)
*G06F 16/28* (2019.01)

(52) U.S. Cl.
CPC ..... *G06Q 30/0625* (2013.01); *G06F 16/2228* (2019.01); *G06F 16/245* (2019.01); *G06F 16/284* (2019.01)

(58) Field of Classification Search
CPC .............................. G06Q 30/06; G06F 17/30
USPC ....................................................... 707/954
See application file for complete search history.

(56) References Cited

U.S. PATENT DOCUMENTS

| | | | |
|---|---|---|---|
| 6,094,649 A | 7/2000 | Bowen | |
| 6,154,213 A * | 11/2000 | Rennison | ........ G06F 17/30716 345/428 |
| 6,338,056 B1 | 1/2002 | Dessloch | |
| 6,457,009 B1 | 9/2002 | Bollay | |
| 6,801,904 B2 | 10/2004 | Chaudhuri | |
| 7,574,432 B1 | 8/2009 | De Bellis | |
| 8,027,970 B1 | 9/2011 | Brette | |
| 2006/0074881 A1 | 4/2006 | Vembu | |
| 2012/0066197 A1 | 3/2012 | Rana | |
| 2012/0254143 A1 | 10/2012 | Varma | |
| 2013/0151381 A1* | 6/2013 | Klein | ................. G06Q 30/0641 705/27.1 |

(Continued)

FOREIGN PATENT DOCUMENTS

WO 2014161201 10/2014

*Primary Examiner* — Mila Airapetian
(74) *Attorney, Agent, or Firm* — Fitch, Even, Tabin & Flannery, LLP

(57) ABSTRACT

A control circuit has access to both a relational database comprised of structured data and a text-based index of reciprocal queries for the relational database. The control circuit, upon receiving a text-based query via a user input, applies the text-based query to the text-based index of reciprocal queries to thereby obtain one or more reciprocal queries that the control circuit uses to query the relational database for structured data content responsive to the text-based query. By one approach the text-based index of reciprocal queries comprises a text-based index of SQL reciprocal queries. By one approach the text-based index of reciprocal queries comprises at least one virtual document.

18 Claims, 3 Drawing Sheets

(56) References Cited

U.S. PATENT DOCUMENTS

2016/0171122 A1* 6/2016 Tonshal ............ G06F 17/30979
707/771
2017/0270171 A1* 9/2017 Shmueli ............ G06F 17/30545

* cited by examiner

APPARATUS TO QUERY A RELATIONAL DATABASE USING TEXT-BASED QUERIES

RELATED APPLICATION(S)

This application claims the benefit of U.S. Provisional application No. 62/187,518, filed Jul. 1, 2015, which is incorporated by reference in its entirety herein.

TECHNICAL FIELD

These teachings relate generally to databases.

BACKGROUND

Relational databases are known in the art. Relational databases typically consist of structured data content and hence constitute relational data with relationships between data items being stored and revealed by tables consisting, for example, of rows and columns. Relational databases follow precise and complex entry/storage requirements in order to ensure that the intended relationships are unambiguously stored. Consequently, relational database queries follow similarly precise and complex query syntax/content requirements in order to ensure an accurate search of the database.

Structured Query Language (SQL) is a special-purpose programming language designed for managing data held in a relational database management system. Originally based upon relational algebra and tuple relational calculus, SQL consists of a data definition language and a data manipulation language. The scope of SQL includes data insert, query, update and delete, schema creation and modification, and data access control.

Unfortunately, though certainly powerful, SQL is not necessarily user-friendly or intuitive. As a result, it can be frustrating or even impossible (from a practical standpoint) for many users in, for example, a physical shopping facility application setting to effectively leverage the contents of a relational database to accomplish any number of routine inquiries that such users might ordinarily seek to conduct during the course of a typical workday. Having an SQL expert continually available is typically not a viable solution in such application settings nor is training all potential users to be proficient in SQL.

BRIEF DESCRIPTION OF THE DRAWINGS

The above needs are at least partially met through provision of the apparatus to query a relational database using text-based queries described in the following detailed description, particularly when studied in conjunction with the drawings, wherein.

Figure 1:
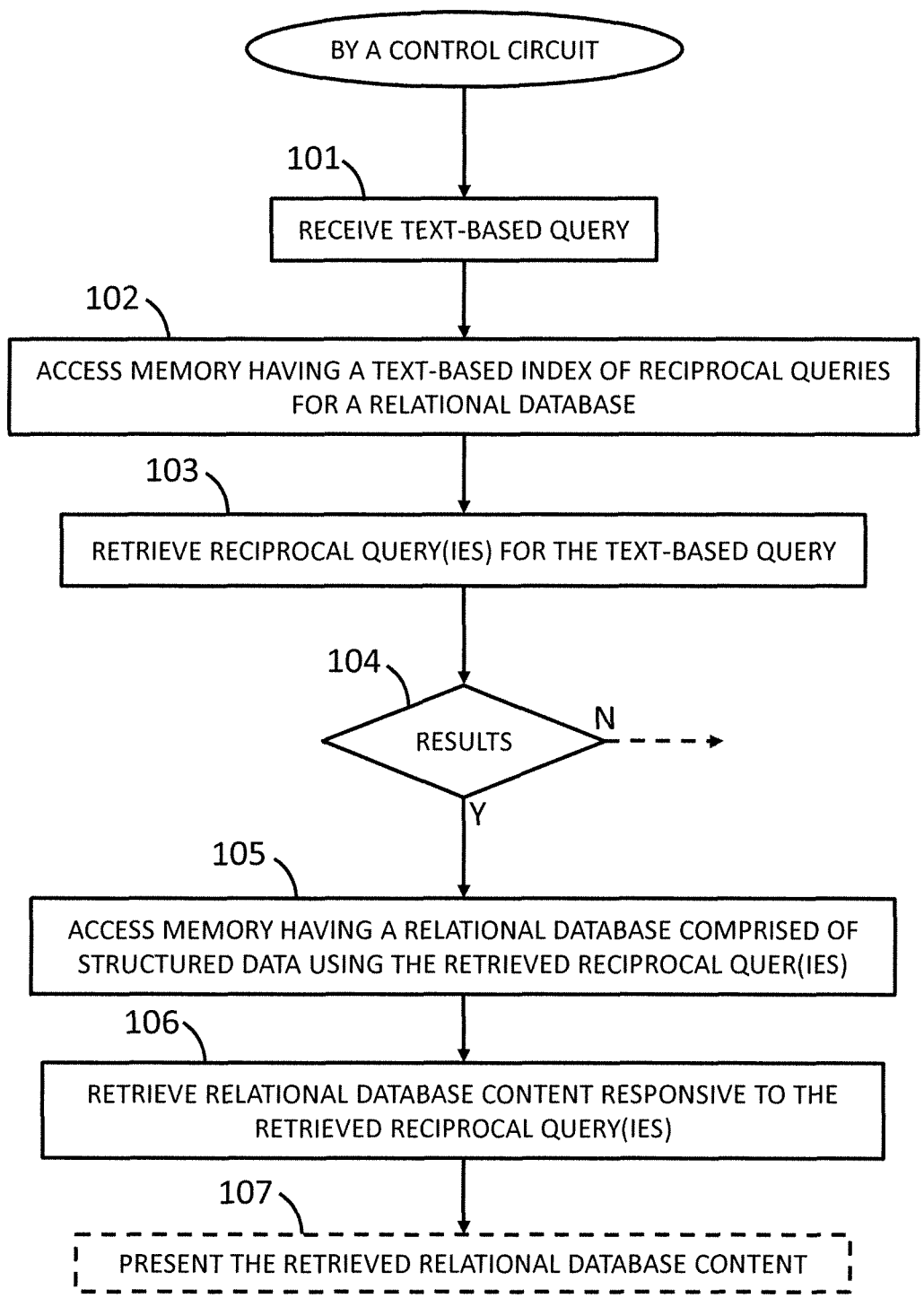
FIG. 1 comprises a flow diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a control circuit has access to both a relational database comprised of structured data and a text-based index of reciprocal queries for the relational database. The control circuit, upon receiving a text-based query via a user input, applies the text-based query to the text-based index of reciprocal queries to thereby obtain one or more reciprocal queries that the control circuit uses to query the relational database for structured data content responsive to the text-based query. By one approach the text-based index of reciprocal queries comprises a text-based index of SQL reciprocal queries. By one approach the text-based index of reciprocal queries comprises at least one virtual document.

By one approach the control circuit conducts the aforementioned activities in a transparent fashion. Accordingly, the control circuit can apply the text-based query to the text-based index of reciprocal queries to thereby query the relational database without presenting to the user any of those reciprocal queries. So configured, the user need only be aware of their own simple text entries and the corresponding results extracted from the relational database.

These teachings are highly flexible in practice. For example, these teachings will readily accommodate text-based queries that include one or more Boolean operators. As another example, the aforementioned control circuit can comprise a part of a server-side configuration or part of a client-side configuration as desired. As yet another example, these teachings will readily accommodate having the control circuit apply the reciprocal query or queries to a plurality of relational databases.

These teachings can be specifically practiced in the context of one or more physical shopping facilities having a plurality of items available for sale and where the aforementioned relational database stores data regarding some or all of those items. So configured, associates at that facility having little or no training with respect to database searching can nevertheless often successfully search such a relational database using a browser-like query-entry mechanism that will likely be familiar to such associates through their everyday experience with browser search engines.

These and other benefits may become clearer upon making a thorough review and study of the following detailed description. Referring now to the drawings, and in particular to FIG. 1, an illustrative process 100 that is compatible with many of these teachings will now be presented.

Figure 2:
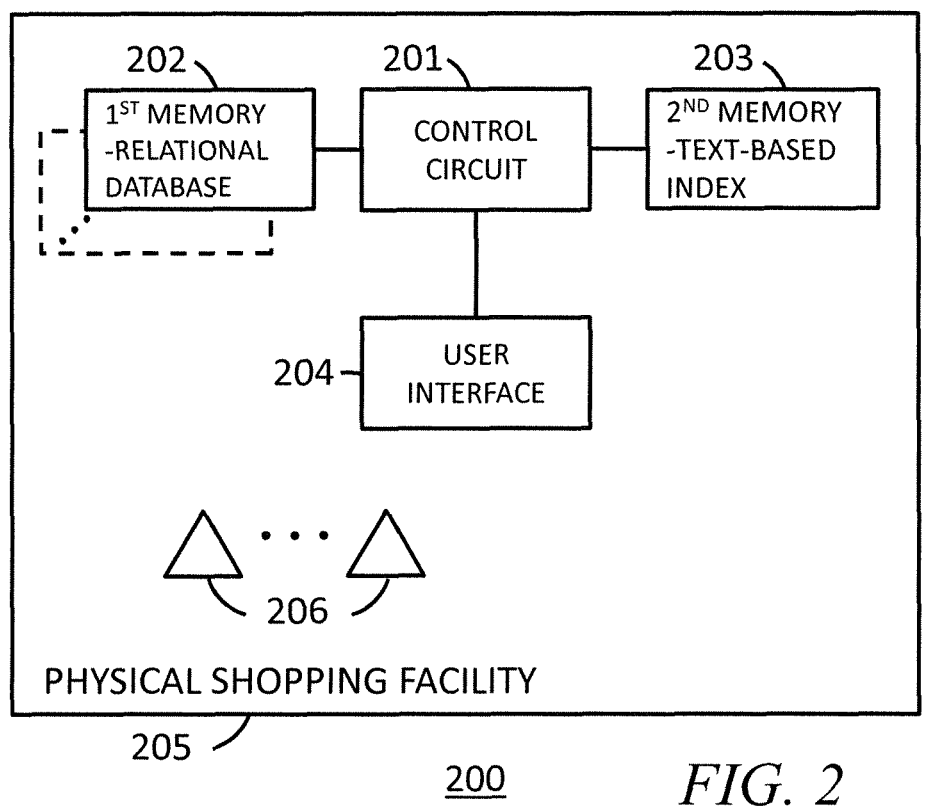
FIG. 2 comprises a block diagram as configured in accordance with various embodiments of these teachings.

This description presumes that a control circuit of choice carries out this process 100. FIG. 2 provides an illustrative example of an apparatus 200 that includes such a control circuit 201. Being a "circuit," the control circuit 201 therefore comprises structure that includes at least one (and typically many) electrically-conductive paths (such as paths comprised of a conductive metal such as copper or silver) that convey electricity in an ordered manner, which path(s)

will also typically include corresponding electrical components (both passive (such as resistors and capacitors) and active (such as any of a variety of semiconductor-based devices) as appropriate) to permit the circuit to effect the control aspect of these teachings.

Such a control circuit 201 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 201 is configured (for example, by using corresponding programming as will be well understood by those skilled in the art) to carry out one or more of the steps, actions, and/or functions described herein.

By one approach the control circuit 201 includes an integral memory that serves for example, to non-transitorily store computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this illustrative example the control circuit 201 also operably couples to a first memory 202 and a second memory 203. These memories 202 and 203 may be integral to the control circuit 201 or can be physically discrete (in whole or in part) from the control circuit 201 as desired. One or both of these memories 202 and 203 can also be local with respect to the control circuit 201 (where, for example, both share a common circuit board, chassis, power supply, and/or housing) or can be partially or wholly remote with respect to the control circuit 201 (where, for example, one or both of these memories 202 and 203 is physically located in another facility, metropolitan area, or even country as compared to the control circuit 201).

The first memory 202 stores at least one relational database comprised of structured data. When the apparatus 200 includes a physical shopping facility 205 having a plurality of items 206 available for sale disposed therein, at least some of the data stored in the relational database can correspond to one or more of that plurality of items 206. Being a relational database, it is possible and even likely that multiple relationships for a particular product may be stored in this way. As a simple example in these regards, the structure of the relational database may correlate a particular pair of jeans to a "men's clothing" category, to a "pants and jeans" category, to an "all-seasons category, and to a "casual wear" category. The contents of the relational database may also correlate one or more of the items 206 with pricing information, available inventory information, and so forth as desired.

The second memory 203 stores at least one text-based index of reciprocal queries for the at least one relational database described above. By one approach, for example, this text-based index of reciprocal queries comprises at least one virtual document (such as a word processing document, a spreadsheet document, or even a simple text document).

The reciprocal queries themselves can comprise, for example, Structured Query Language (SQL) reciprocal queries that are compatible with and directly usable by the aforementioned relational database to effect a query and response thereto. An SQL query typically includes the declarative SELECT statement and typically includes a list of columns to include in the final result, immediately following the SELECT keyword (or an asterisk can serve to specify that the query should return all columns of the queried tables). An SQL query can include other keywords or clauses including the FROM clause, the WHERE clause, the GROUP BY clause, the HAVING clause, and the ORDER BY clause.

As a very simple example in these regards, an example of a SELECT query that would return all rows from a "men's clothing" table for "jeans" where inventory is immediately available and with the results being sorted by brand might appear as follows:

SELECT *
   FROM Men's clothing
   WHERE Jeans
   WHERE Inventory immediately available
   ORDER BY Brand The aforementioned text-based index of reciprocal queries serves to at least pair pre-written SQL queries with corresponding text. In the example just provided, that particular SQL query might be paired with the text string "jeans available" and/or the text string "men's jeans inventory" with other examples certainly being possible. By one approach such an index can be created in whole or in part by one or more authorized persons. As will be shown below, these teachings will also accommodate creating one or more such expressions automatically.

If desired, the text-based index can include one or more Boolean operator. For example, the aforementioned illustrative text string "jeans available" could also be represented as "jeans and available."

In this illustrative example the control circuit 201 also operably couples to at least one user interface 204. This user interface 204 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user. These teachings will also accommodate a less direct user interface such as an application programming interface (API).

With continued reference to both FIGS. 1 and 2, at block 101 the control circuit 201 receives a text-based query (for example, via the aforementioned user interface 204). The format and syntax of this text-based query can be very simple if desired. By one approach, for example, the user can enter a text-based query that is similar or identical to how that user would implement such a search using a common browser search engine such as the Google or Yahoo browsers. If the user were looking to answer the question "How many jeans are currently in inventory?" the user's text-based query might be as simple as "jeans inventory." If desired, these teachings will permit and support the text-based query to include at least one Boolean operator such as AND, OR, or NOT.

At block 102 the control circuit 201 accesses the aforementioned second memory 203 to thereby access the aforementioned text-based index of reciprocal queries for a relational database. Since the text-based index is "text-based," a very simple search or "find" operation that employs the text in the text-based query can readily serve to identify and retrieve indexed correlations between those words and corresponding SQL queries. Accordingly, at block 103, the control circuit 201 retrieves one or more reciprocal queries as correspond to the text-based query. (By one approach the control circuit 201 retrieves the reciprocal query or queries without also presenting to the user (via the user interface 204 or otherwise) any of the reciprocal queries themselves.)

At block 104 the control circuit 201 can determine whether any reciprocal queries were in fact so retrieved. In the absence of retrieving any reciprocal queries this process 100 can accommodate any of a variety of responses as desired. By one approach, for example, the control circuit 201 provides a response to the user via the user interface 204 to indicate this lack of any results.

When the control circuit 201 in fact retrieves one or more reciprocal queries, at block 105 the control circuit 201 accesses the first aforementioned memory 202, which stores the relational database. In particular, the control circuit 201 uses the one or more retrieved reciprocal queries to access the relational database. (These teachings will also readily accommodate having the control circuit 201 access a plurality of such relational databases which may or may not all be stored at the first memory 202.) As noted above, these reciprocal queries have the appropriate SQL format and hence are readily and compatibly usable to so access the relational database.

At block 106 the control circuit 201 retrieves relational database content that responds to those applied retrieved reciprocal queries. At optional block 107 the control circuit 201 presents that retrieved relational database content to the user (for example, via the aforementioned user interface 204). By one approach the control circuit 201 presents these results without also indicating which relational database (or relational databases) sourced the provided structured data content.

So configured, the power and richness of one or more structured data resources is readily accessed and leveraged by individuals lacking formal or even informal training regarding the proper structure of an SQL query by permitting the user to employ a simple browser-like textual query that is not properly formatted as an SQL query.

Figure 3:
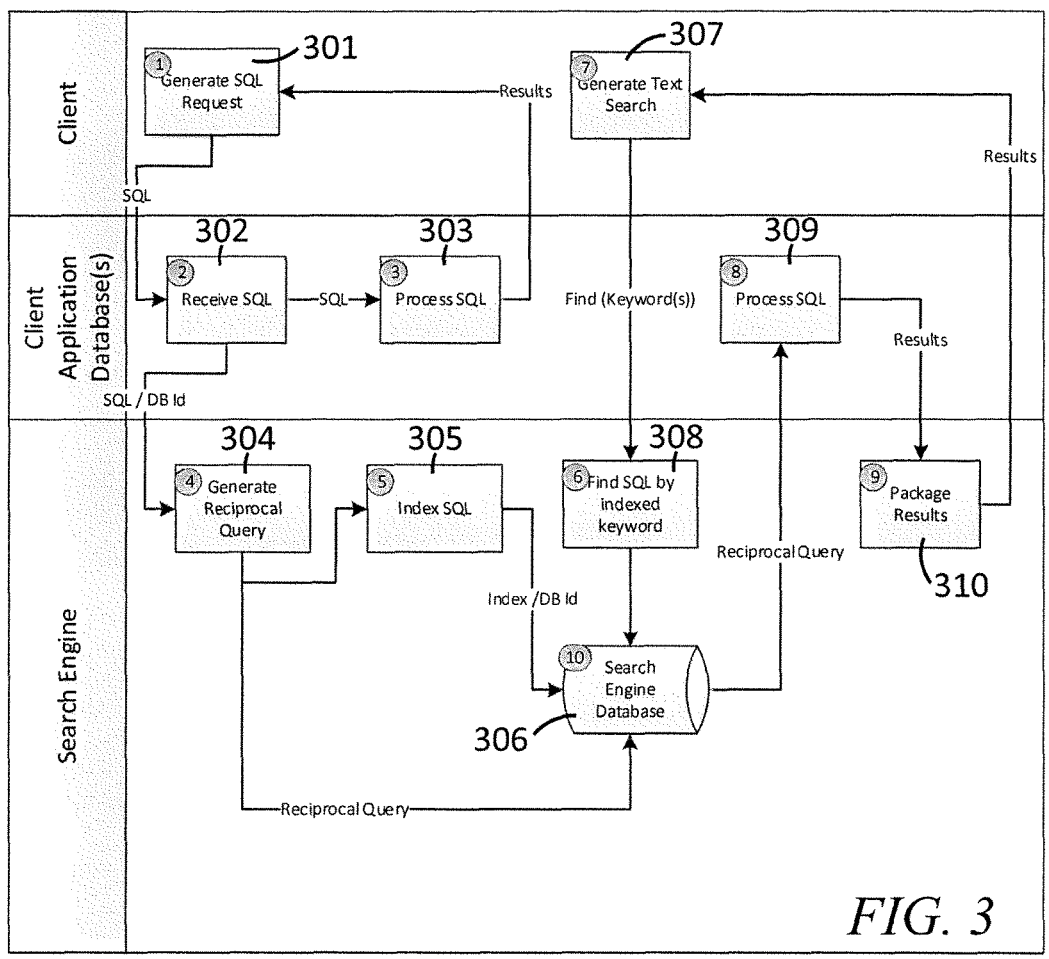
FIG. 3 comprises a multi-entity process flow diagram as configured in accordance with various embodiments of these teachings.

Referring now to FIG. 3, a more specific example in these regards will be provided. It will be understood that no particular limitations are intended by way of the specificity of this example.

At block 301 a client platform generates an SQL request. At block 302 one or more client application databases receive the corresponding SQL query and, at block 303, process that SQL inquiry and return the results to the client. The client application database, upon having received the aforementioned SQL inquiry, also forwards the SQL inquiry along with a database identifier to a search engine as shown at block 304 where the search engine generates a corresponding reciprocal query. The resultant reciprocal query is used at block 305 to index the SQL query. That index information, along with the aforementioned reciprocal query, are then stored at a search engine database 306.

So configured, the aforementioned text-based index of reciprocal queries can be automatically built and/or added to over time.

At block 307 the aforementioned client generates a text-based search by, for example, parsing a text-based search as entered by a user to find one or more keywords. At block 308 the aforementioned search engine locates an appropriate SQL query such that a corresponding reciprocal query is returned by the search engine database 306 to the client application database or databases. At block 309 the latter processes that corresponding SQL inquiry and the corresponding search results are provided to the search engine. At block 310 the search engine packages those results (for example, by aggregating responses from more than one database or by suitably combining multiple responses from a single database) and provides those results back to the client.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus comprising:
    a first memory having at least one relational database comprised of structured data stored therein;
    a second memory having a text-based index of reciprocal queries for the at least one relational database;
    a user interface;
    a control circuit operably coupled to the first memory, the second memory, and the user interface, the control circuit configured to:
    obtain a set of rules that identify a reciprocal query from the second memory as a function of a text-based query by searching the text-based index to identify text-based entries in the text-based index that correlate to the text-based query and then retrieving a reciprocal query that correlates to the identified text-based entry in the text-based index;
    receive a text-based query via the user interface;
    identify a reciprocal query from the second memory by evaluating the received text-based query against the set of rules;
    use the identified reciprocal query to query the relational database for structured data content responsive to the text-based query.

2. The apparatus of claim 1 wherein the text-based index of reciprocal queries comprises a text-based index of Structured Query Language (SQL) reciprocal queries.

3. The apparatus of claim 1 wherein the text-based index of reciprocal queries comprises at least one virtual document.

4. The apparatus of claim 1 wherein the text-based query includes at least one Boolean operator.

5. The apparatus of claim 1 wherein the control circuit is configured to apply the text-based query to the text-based index of reciprocal queries to thereby query the relational database without presenting to a user via a user interface any of the reciprocal queries.

6. The apparatus of claim 1 wherein the control circuit comprises a part of a server-side configuration.

7. The apparatus of claim 1 wherein the control circuit comprises a part of a client-side configuration.

8. The apparatus of claim 1 wherein the control circuit is configured to apply the text-based query to the text-based index of reciprocal queries to thereby query a plurality of relational databases for structured data content responsive to the text-based query.

9. The apparatus of claim 8 wherein the control circuit is further configured to provide the structured data content that is responsive to the text-based query via the user interface without indicating which of the plurality of relational databases sourced the provided structured data content.

10. An apparatus comprising:
- at least one physical shopping facility having a plurality of items available for sale;
- a first memory having at least one relational database comprised of structured data stored therein regarding the plurality of items;
- a second memory having a text-based index of reciprocal queries for the at least one relational database;
- a user interface;
- a control circuit operably coupled to the first memory, the second memory, and the user interface, the control circuit configured to:
- obtain a set of rules that identify a reciprocal query from the second memory as a function of a text-based query by searching the text-based index to identify text-based entries in the text-based index that correlate to the text-based query and then retrieving a reciprocal query that correlates to the identified text-based entry in the text-based index;
- receive a text-based query regarding at least one of the plurality of items via the user interface;
- identify a reciprocal query from the second memory by evaluating the received text-based query against the set of rules;
- use the identified reciprocal query to thereby search the relational database for structured data content responsive to the text-based query.

11. The apparatus of claim 10 wherein the text-based index of reciprocal queries comprises text-based index of Structured Query Language (SQL) reciprocal queries.

12. The apparatus of claim 10 wherein the text-based index of reciprocal queries comprises at least one virtual document.

13. The apparatus of claim 10 wherein the text-based query includes at least one Boolean operator.

14. The apparatus of claim 10 wherein the control circuit is configured to apply the text-based query to the text-based index of reciprocal queries to thereby query the relational database without presenting to a user via a user interface any of the reciprocal queries.

15. The apparatus of claim 10 wherein the control circuit comprises a part of at least one of a server-side configuration and a client-side configuration.

16. The apparatus of claim 10 wherein at least some entries in the text-based index of reciprocal queries were automatically generated.

17. The apparatus of claim 10 wherein the control circuit is configured to apply the text-based query to the text-based index of reciprocal queries to thereby query a plurality of relational databases for structured data content responsive to the text-based query.

18. The apparatus of claim 17 wherein the control circuit is further configured to provide the structured data content that is responsive to the text-based query via the user interface without indicating which of the plurality of relational databases sourced the provided structured data content.

* * * * *